United States Patent
Doenges et al.

(10) Patent No.: US 9,428,099 B1
(45) Date of Patent: Aug. 30, 2016

(54) UNIVERSAL LIGHTBAR MOUNTING ASSEMBLY

(71) Applicant: SoundOff Signal, Inc., Hudsonville, MI (US)

(72) Inventors: Scott Doenges, Hudsonville, MI (US); Gary Ludwig, Zeeland, MI (US)

(73) Assignee: Emergency Technology, Inc., Hudsonville, MI (US)

( * ) Notice: Subject to any disclaimer, the term of this patent is extended or adjusted under 35 U.S.C. 154(b) by 218 days.

(21) Appl. No.: 14/101,746

(22) Filed: Dec. 10, 2013

Related U.S. Application Data

(60) Provisional application No. 61/735,803, filed on Dec. 11, 2012.

(51) Int. Cl.
| | |
|---|---|
| *B60Q 1/26* | (2006.01) |
| *F21V 21/30* | (2006.01) |
| *B60Q 1/00* | (2006.01) |
| *F21S 8/10* | (2006.01) |
| *F21V 21/08* | (2006.01) |

(52) U.S. Cl.
CPC ............. *B60Q 1/00* (2013.01); *B60Q 1/2611* (2013.01); *F21S 48/212* (2013.01); *F21V 21/30* (2013.01); *F21V 21/0816* (2013.01)

(58) Field of Classification Search
CPC ...... B60Q 1/00; B60Q 1/2611; F21S 48/211; F21S 48/212; B60R 9/055; B60R 9/058; F21V 21/0808; F21V 21/26; F21V 21/30
See application file for complete search history.

(56) References Cited

U.S. PATENT DOCUMENTS

| | | | | |
|---|---|---|---|---|
| 2,596,860 | A * | 5/1952 | McCrory | B60R 9/058 224/325 |
| 3,452,893 | A * | 7/1969 | Heflin | B60P 3/1025 224/310 |
| 3,761,890 | A * | 9/1973 | Fritts et al. | 340/473 |
| 4,114,789 | A | 9/1978 | Blaylock et al. | |
| 4,120,435 | A * | 10/1978 | Eby | 224/322 |
| 4,354,625 | A * | 10/1982 | Peoples | B60R 9/058 224/325 |
| 4,586,638 | A * | 5/1986 | Prescott | B60R 9/058 224/320 |
| 4,588,118 | A | 5/1986 | Ferenc et al. | |
| 4,823,996 | A * | 4/1989 | Mosher | 362/543 |
| 4,928,216 | A * | 5/1990 | Carr | 362/543 |
| 4,995,538 | A * | 2/1991 | Marengo | B60R 9/058 224/315 |
| 5,282,562 | A * | 2/1994 | Legault | B60R 9/058 224/326 |
| 5,335,836 | A * | 8/1994 | Waddell | B60R 9/058 224/322 |
| 5,358,162 | A * | 10/1994 | Hill | B60R 9/045 224/316 |
| 6,845,893 | B2 | 1/2005 | Nelson | |
| 7,244,053 | B2 | 7/2007 | Bader et al. | |
| 7,517,120 | B2 | 4/2009 | Smith | |
| 7,819,565 | B2 | 10/2010 | Stein | |
| 7,954,783 | B2 * | 6/2011 | Vigil | 248/553 |
| 8,292,478 | B2 | 10/2012 | Bader et al. | |
| 2010/0230566 | A1 | 9/2010 | Neufeglise | |

* cited by examiner

*Primary Examiner* — Alan Cariaso

(74) *Attorney, Agent, or Firm* — McGarry Bair PC

(57) ABSTRACT

A universal lightbar foot and mounting assembly for adjustably mounting a lightbar on an emergency vehicle includes a foot, a flexible strap mounted to the foot and with a free end configured to be secured to a side of a vehicle; a light bar bracket configured to be mounted to a light bar; and a connector for rotatably mounting the lightbar bracket to the foot for rotational adjustment of a lightbar bracket with respect to the foot. The foot has a strap adjuster for adjustably attaching the flexible strap to the foot for adjusting the relative position of the foot with respect to the free end of the strap.

15 Claims, 6 Drawing Sheets

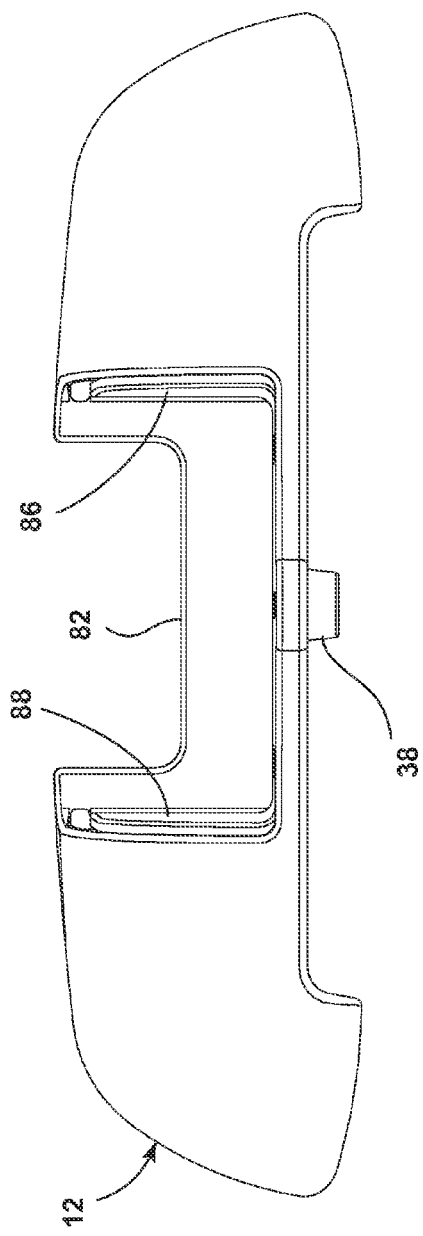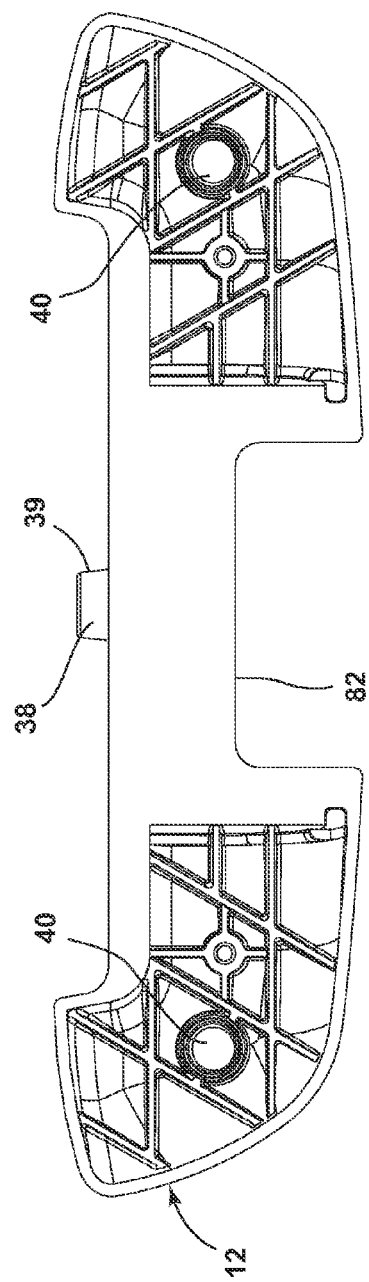
FIG. 5
FIG. 6

UNIVERSAL LIGHTBAR MOUNTING ASSEMBLY

CROSS-REFERENCE TO RELATED APPLICATION

This application claims the benefit of U.S. Provisional Patent Application No. 61/735,803, filed Dec. 11, 2012, which is incorporated herein by reference in its entirety.

FIELD OF THE INVENTION

This invention relates to mounting assembly for emergency vehicle lighting. In one of its aspects, the invention relates to a universal foot and mounting bracket for securely coupling a lightbar to the roof of an emergency vehicle.

BACKGROUND

The primary function of an emergency vehicle's warning lighting system is to draw the attention of motorists and pedestrians to the emergency vehicle. Accomplishing this function provides safety to the driver of the emergency vehicle and approaching motorists and pedestrians. The most critical factors to increase emergency vehicle visibility includes: the intensity, or brightness, of the warning light, the contrast of the light to its surrounding environment and, finally, where the light is installed on the vehicle.

The method of installing a lightbar onto an emergency vehicle is typically highly dependent upon the configuration of the particular lightbar and the shape of the roofline of the emergency vehicle. Generally, the variability of longitudinal curvature of the roof for different models of emergency vehicle dictates a custom mount for each vehicle and lightbar combination. Often sheet metal will be formed to conform to the shape of the vehicle from the door jamb up to the roof line where the lightbar will be mounted. This method often proves time-consuming and expensive as custom hardware is necessitated for each installation.

Mounting foot assemblies have been developed and used for attaching lightbars to emergency vehicles. Some examples of mounting foot assemblies for lightbars on an emergency vehicle are disclosed in U.S. Pat. Nos. 7,244,053, 7,517,120 and 7,819,565. Emergency lights are manufactured by companies such as Whelen Engineering Inc., Federal Signal, Code 3, Tomar, Rontan, and SoundOff Signal®.

Bader et al. U.S. Pat. No. 7,244,053 discloses a lightbar and mounting feet for mounting to an exterior surface of an emergency vehicle. The mounting feet can be connected to an emergency vehicle with conventional methods including metal roof straps and serve to attach and space the lightbar off of the roof. Additionally the mounting feet provide a platform for mounting additional components such as auxiliary lights for side lighting.

Smith U.S. Pat. No. 7,517,120 discloses a mounting foot for a lightbar that can provide for variations in the longitudinal slope of a vehicle roof. A sidelight can additionally be mounted directly to the mounting foot with a bracket that conforms to the shape of the top surface of the base of the mounting foot. Stein U.S. Pat. No. 7,819,565 discloses a lightbar mounted to the roof of a vehicle with a mounting foot. The mounting foot includes a recessed platform located below the lightbar. Auxiliary side lighting can be rotatably connected to the base of the light assembly on the recessed platform.

SUMMARY OF THE INVENTION

According to the invention, a universal lightbar mounting assembly for adjustably mounting a lightbar on an emergency vehicle comprises a foot including a flexible strap with a free end configured to be secured to a side of a vehicle; a light bar bracket configured to be mounted to a light bar; and a connector for rotatably mounting the lightbar bracket to the foot for rotational adjustment of a lightbar bracket with respect to the foot.

In one embodiment of the invention, the foot comprises a strap adjuster for adjustably attaching the flexible strap to the foot for adjusting the relative position of the foot with respect to the free end of the strap. The flexible strap can be attached to the emergency vehicle by a screw or a hook.

In another embodiment, the strap adjuster is a clutch that selectively retains the strap in a selected adjusted position within the foot. The clutch may be a bracket with an elongated opening disposed in a bottom wall thereof and a bar slidably mounted to bracket for movement transverse to the elongated opening between a release position and a locked position. The strap may be threaded through the elongated opening, around the bar and back through the slot.

In a preferred embodiment, the flexible strap may be woven webbing and the woven webbing may be non-metallic. The flexible strap may also be a cable or coated wire.

In another embodiment, the connector mounting includes an annular hub and a mounting socket that rotatably receives the annular hub. The annular hub can be tapered and the mounting socket can have a complementary bore.

Further according to the invention, a universal lightbar mounting assembly for adjustably mounting a lightbar on an emergency vehicle can include a foot having a flexible strap with a free end configured to be secured to a side of a vehicle and further including a strap adjuster for adjustably attaching the flexible strap to the foot for adjusting the relative position of the foot with respect to the free end of the strap. A lightbar bracket can be configured to mount on end of a lightbar. A connector can mount the lightbar bracket to the foot.

Still further according to the invention, a lightbar assembly for mounting to a vehicle comprising a light bar and a universal lightbar mounting assembly as described above mounted to each end of the lightbar.

Further according to the invention, a method for mounting a lightbar to a vehicle attaching the lightbar bracket of a lightbar mounting assembly of the lightbar assembly described above to each end of the lightbar and attaching the free end of the flexible strap of each lightbar mounting assembly to the vehicle. The position of the foot of at least one of the lightbar mounting assemblies can be adjusted with respect to the free end of the flexible strap with the strap adjuster and the axial position of the light bar can be adjusted with respect to the foot of at least one of the lightbar mounting assemblies.

In one embodiment, the lightbar can be rotated with respect to the foot about an axis parallel to the longitudinal axis of the lightbar.

The invention provides a universal mounting structure for mounting lightbars on a variety of emergency vehicles of different roof configurations with the rotational adjustment necessary to position the lightbars in a desirable position to effectively alert approaching pedestrians and motorists.

BRIEF DESCRIPTION OF THE DRAWINGS

In the drawings:

FIG. 5 is a top plan view of the lightbar foot member of the universal lightbar foot and mounting assembly illustrated in FIGS. 1-4.

FIG. 6 is a bottom plan view of the lightbar foot of FIG. 5.

DETAILED DESCRIPTION

Figure 1:
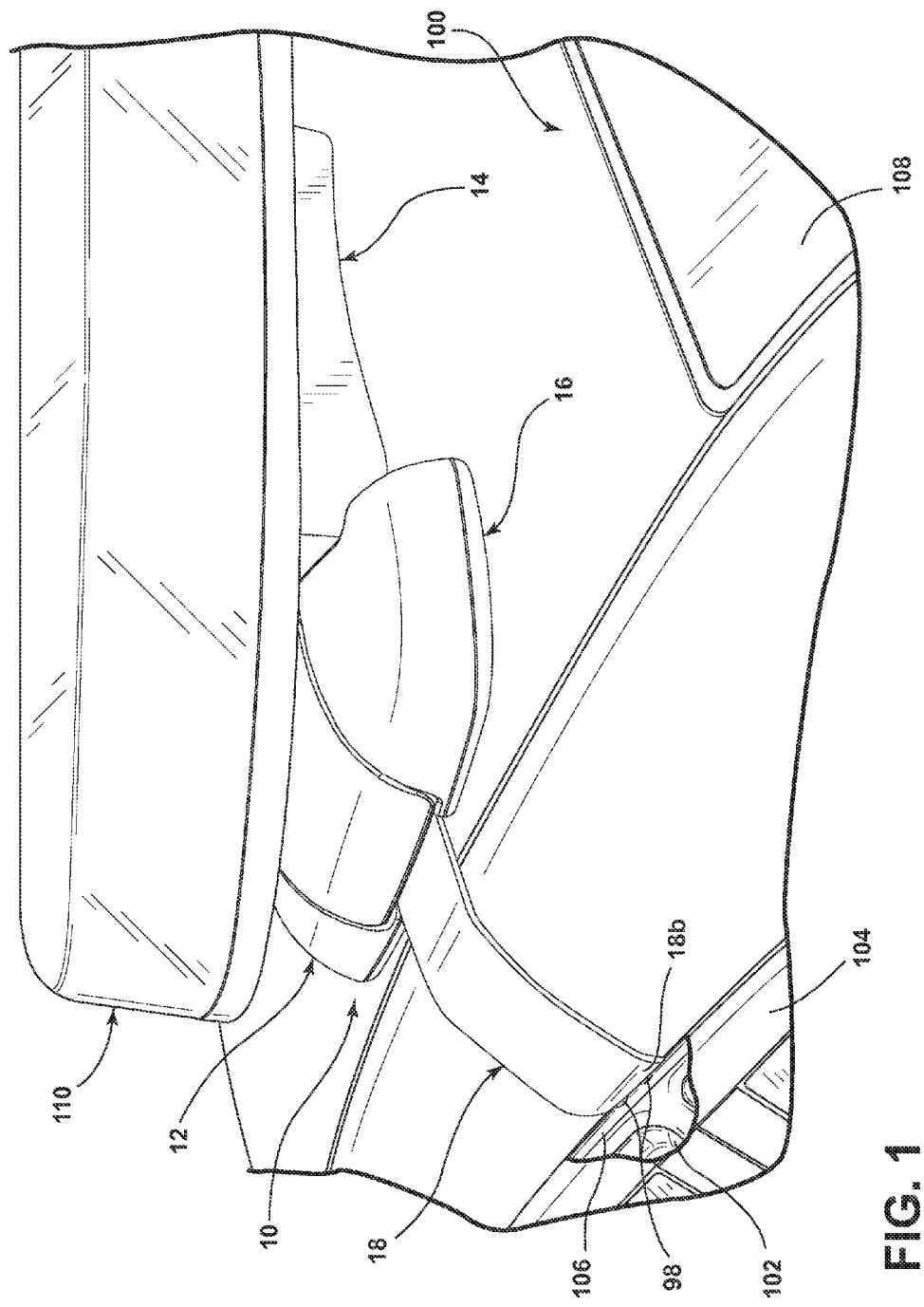
FIG. 1 is a perspective view of a universal lightbar foot and mounting assembly secured to an emergency vehicle with an installed lightbar according to an embodiment of the invention
Figure 2:
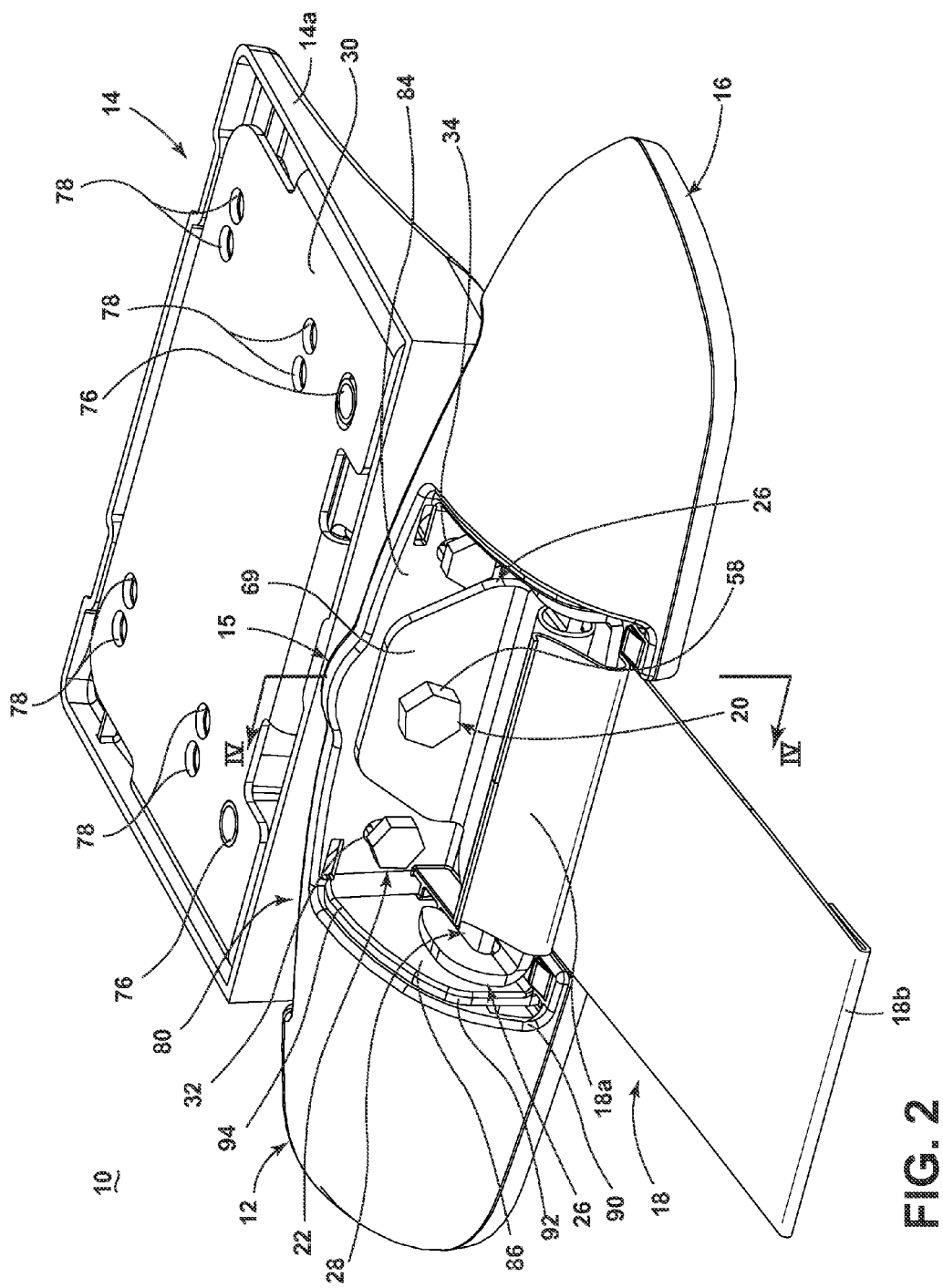
FIG. 2 is a perspective view of a universal lightbar foot and mounting assembly according to an embodiment of the invention.

Referring now to the drawings and to FIGS. 1-4 in particular, the universal lightbar foot and mounting assembly 10 for adjustably mounting a lightbar 110 on an emergency vehicle 100 according to an embodiment of the invention comprises a lightbar foot 12 including a flexible strap 18, cable or coated wire configured to be secured to the side of the vehicle 100; a lightbar bracket 14 configured to be mounted to the lightbar 110 and a connector 15 for rotatably mounting the lightbar bracket 14 to the lightbar foot 12 for rotational adjustment of the lightbar bracket 14 with respect to the lightbar foot 12. The lightbar foot 12 comprises a strap adjuster 26 for adjusting the relative position of the free end of the flexible strap 18 with respect to the lightbar foot 12 and thereby adjusting the relative position of the lightbar foot 12 with respect to the free or distal end 18b of the strap 18.

The lightbar foot 12 can include a base surface 82 with a rear wall 84 that extends vertically from a substantially planar base 82. Two arcuate slots 32, 34 can be provided through the rear wall 84 and located in alignment with a respective bore 44 in the lightbar bottom support 14a. Bisecting the arcuate slots 32, 34, a bore 36 can be provided through the rear wall 84 and through an annular hub 38. The annular hub has a tapered outer surface 39 that fits within a complementary tapered bore 46 at the center of the mounting socket 42 in the lightbar bottom support 14a.

Additionally, two side walls 86, 88 can extend vertically from the base surface 82 to be substantially orthogonal to both the rear wall 84 and the base surface 82. A stop 89 can be positioned in the corners of each side wall 86, 88, the base 82 and the rear wall 84. The two side walls 86, 88 can have a profile defined by an arc that is swept from a point on the periphery of the base surface 82 opposite of the rear wall 84 up to a point on the top of the rear wall 84. A ridge 92 can be disposed along the profile of the side surface 86. At the end of the ridge 92 furthest from the rear wall 84 of the lightbar foot 12, a slot 90 can be molded into the lightbar foot 12. At the end of the ridge 92 nearest the rear wall 84 of the lightbar foot 12, an indent 94 can be molded into the lightbar foot 12. The opposing side surface 88 can also have a ridge and an arrangement of slots and indents. The ridges, slots and indents disposed on the side walls 86, 88 such as the slot 90, ridge 92 and indent 94 on side surface 86 can enable the quick attachment of a foot cover 24. The foot cover 24 can be attached to the lightbar foot 12 to cover the two side walls 86, 88 and the rear wall 84 where the arcuate slots 32, 34 and the bore 36 can be located.

The exterior shape of the lightbar foot 12 can be defined by sweeping the profile of the two side walls 86, 88 along a curve, resulting in a smoothly tapered exterior surface. The specific shape of the exterior surface of the lightbar foot 12 can be formed into one of many aesthetically appealing shapes. The specific shape of the foot cover 24 can preferably match the shape of the exterior surface of the lightbar foot 12. The invention is not limited to the particular shape of the exterior surface of the lightbar foot 12 and foot cover 24 shown in the figures and can vary over a wide range for aesthetic purposes.

To provide a secure coupling between the lightbar foot 12 and an emergency vehicle that will not damage the finish of the emergency vehicle, a vehicle gasket 16 can be fit to the bottom of the lightbar foot 12. Preferably made of rubber, the vehicle gasket 16 can form fit to the lightbar foot 12 and can engage the lightbar foot 12 with two rubber protrusions 96. The rubber protrusions 96 can fit into receptors 40, best seen in FIGS. 5 and 6 formed in the underside of the lightbar foot 12.

The configuration of the two side walls 86, 88, the rear wall 84 and the base surface 82, can provide an interior space that can house the proximate end 18a of the flexible strap 18 and the strap adjuster 26. The flexible strap 18 can preferably be a strong, woven fabric such as webbing typically constructed of a flat, mesh material that is often used in place of rope. Webbing can be made of natural fibers like cotton or flax, but is preferably a strong synthetic material for use in an embodiment of the present invention. Examples of high strength synthetic fibers for webbing are nylon, polypropylene and polyester. Specific products include Kevlar and Dyneema. Webbing with strong resistance to degradation from exposure to ultraviolet (UV) light is preferred. Materials that are known to provide high strength fibers and UV resistance are nylon, bulked nylon and polyester. Preferred webbing will have a breaking strength that far exceeds the expected forces applied to the webbing in the case a vehicular accident. Additionally, the strap 18 may be cut and abrasion resistant. In one embodiment of the invention, a metallic wire mesh can be wrapped around the flexible strap 18 to provide increased cut and abrasion resistance. Alternatively, the strap 18 can be made completely of wire mesh, coated wire or a cable or can be a wire plate molded into webbing. Thus, the term "strap" is intended to include all forms of flexible material that can perform the function of adjustably connecting the foot 12 to the edge of the roof of a vehicle. As used herein, the term "flexible" means that the strap is pliable so that it can conform to the shape of the vehicle. In the preferred embodiment that uses the strap adjuster 26 described below, the strap can be pliable so that it can wrap around the sleeve adjuster 28. In other embodiments, where an alternative strap adjuster is used, the strap need not be pliable enough to wrap around a sleeve adjuster in the event that a ratchet or gear adjuster is used. The term "flexible" thus could include a semi-rigid material that would conform to the shape of a vehicle in use. Typically, the strap will be about 3-4 inches wide but straps between 1.5-6 inches or greater can be used depending on the strength of the materials, aesthetics or other considerations.

The strap adjuster 26 comprises a rigid rectangular metal bracket 27 and a sleeve adjuster 28. The strap adjuster functions as a clutch or ratchet for selectively adjusting the position of the strap 18 within the foot and therefore maintaining the position of the foot in an adjusted position with respect to the vehicle. The metal bracket 27 has an elongated lower opening 68 disposed in a bottom wall. Two upturned arms 66 can extend vertically from the bottom wall of the bracket 30 to be substantially orthogonal to the elongated lower opening 68. An upturned flange 69 extending the length of the elongated lower opening 68 extends upwardly from a rear end of the bracket 30 and has an opening 70. The two upturned arms 66 are each provided with an elongated open ended slot 67. The sleeve adjuster 28 can be a substantially cylindrical rigid metal bar with flattened ends 29. The flattened ends 29 slide freely within the slots 67, The sleeve adjuster 28 can be slidably mounted to the strap adjuster 26 between the two upturned arms 66 of the strap adjuster 26 by insertion of the flattened ends 29 into the open ends of the slots 67 in the two upturned arms 66. The stops 89 prevent the sleeve adjuster from sliding out of the slots 67 when the strap adjuster has been placed within the lightbar foot 12. In one embodiment of the invention, the surface of the central portion of the sleeve adjuster 28 can be knurled to enhance the frictional force between the strap 18 and the sleeve adjuster 28. The sleeve adjuster 28 is slidably mounted to the bracket 68 for movement in the slots 29 transverse to the elongated opening 68 between a release position and a locked position. The strap is threaded through the elongated opening 68, around the sleeve adjuster 28 and back through the elongated opening 68.

The lightbar bracket 14 can include a bottom support 14a and a cover plate 30. The bottom support 14a includes a front planar wall 80 with a centrally located mounting socket 42 mechanically coupled to the lightbar foot 12 via a suitable fastener such as a bolt 20. Additionally, in a preferred embodiment of the invention, the cover plate 30 may be coupled to the centrally located mounting socket 42 and the lightbar foot 12 via the bolt 20. Although the lightbar mounting bracket 30 and the cover 14 are illustrated as separate elements, they can be combined into a unitary structure according to the invention. The lightbar foot 12 and lightbar bracket 14 can be formed of thermoplastic that is injection molded, metal casting or glass-filled resin.

The lightbar bottom support 14a can be a unitary structure that can be molded to form integral elements including a vertically planar wall 80, a set of supporting ribs 53, bores 44, 46 and bosses 48, 50 with bores to aid in coupling the lightbar bottom support 14a to other elements of the universal lightbar foot and mounting assembly 10. The exterior wall of the lightbar bottom support 14a can provide slotted elements 54 to be used as an integration area for a silicone flange added to the bottom of a lightbar to prevent noise. Depending upon the implementation, the lightbar bottom support 14a may also substantially integrate the structure of the mounting bracket cover 30.

Figure 3:
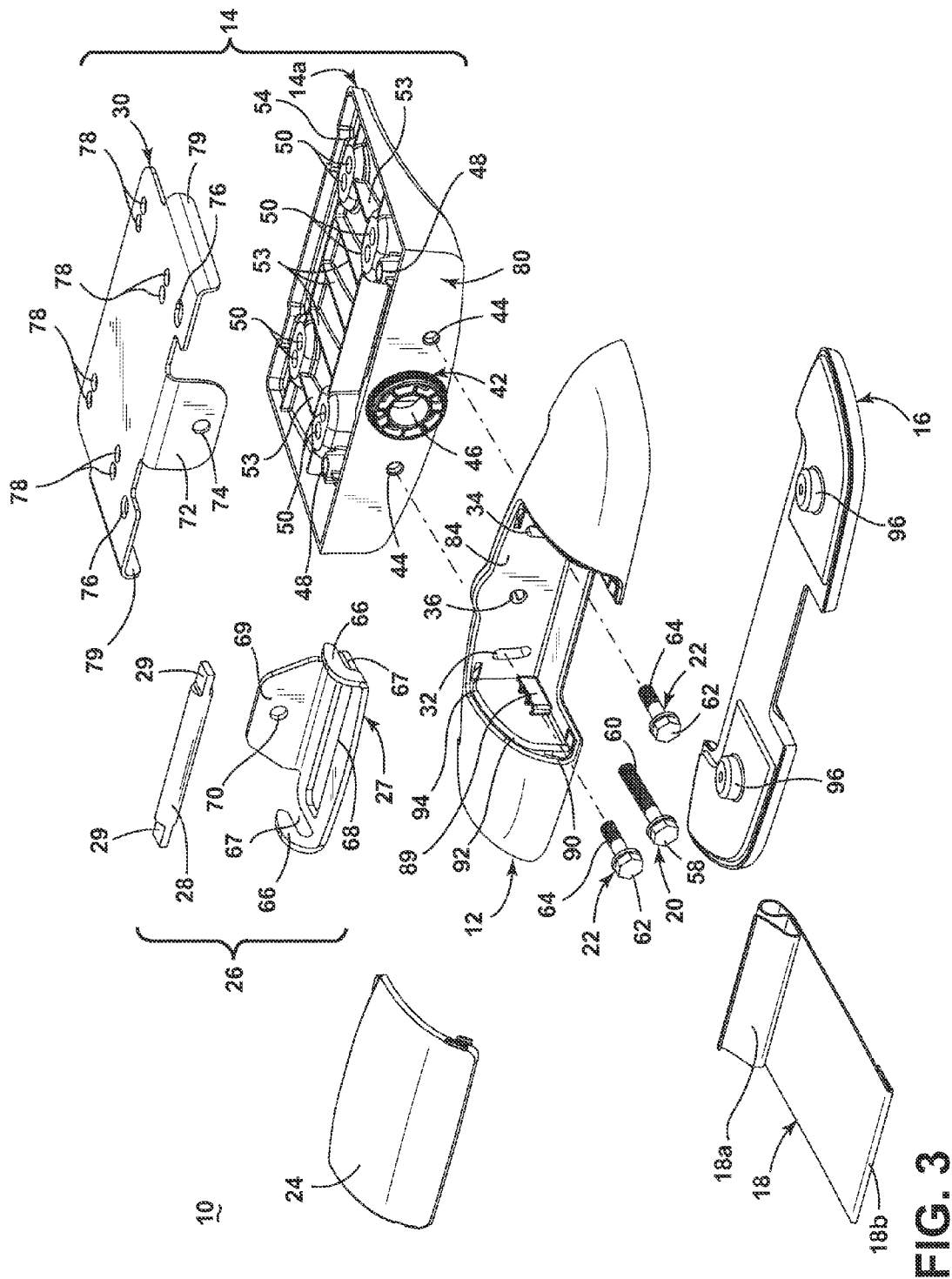
FIG. 3 is an exploded perspective view of the universal lightbar foot and mounting assembly of FIG. 2.

The profile of the underside surface of the lightbar bottom support 14a, as best seen in FIG. 3, can be uneven and generally sloping upwards away from the lightbar foot 12. The particular profile can vary depending upon the implementation and can primarily be determined by the longitudinal slope of the roof of the emergency vehicle, that is, the generally increasing slope of the roofline from the doors of the vehicle up to the center of the roof. The lightbar bottom support 14a can include two bores 44 through the front planar wall 80. Bisecting the two bores 44 on the front planar wall 80, the centrally located mounting socket 42 can also be provided with a bore 46 at the central portion of the mounting socket 42. The mounting socket 42 can be formed as a series of cavities or can be a solid structure, depending upon the implementation and the material used for forming the lightbar bottom support 14a. In one preferred implementation, the lightbar bottom support 14a is molded plastic and the mounting socket 42 is formed as a series of connected cavities as shown in FIG. 3.

Formed into the lightbar bottom support 14a, bosses 48, 50 can provide bores for receiving mounting screws. As shown in FIG. 3, two bosses 50 with bores can be provided next to two smaller bosses 48, each with a mounting bore, and two bosses 50 are provided at the rear of the cover 14. Because the bores aid in the mechanical coupling of the lightbar bottom support 14a to a lightbar bracket 30, the number and diameter of the bores provided by each molded surface can vary upon the implementation and the specific configuration of the lightbar bracket 30 to be attached.

To provide additional structural support, a plurality of vertically extending ribs 53 can be formed into the lightbar bottom support 14a to run substantially perpendicular to the front planar wall 80. The plurality of ribs 53 can run the entire length of the lightbar bottom support 14a or can be interspersed among other structural elements of the lightbar bottom support 14a. For example, ribs 53 can be placed to connect the molded structures with bores 50 to an edge wall of the lightbar bottom support 14a. In another example, ribs can be formed to connect multiple molded structures internal to the lightbar bottom support 14a. The exact number and configuration of the ribs will vary depending upon the implementation, but should depend, in part, upon the number and configuration of molded structures internal to the lightbar bottom support 14a. Additional supporting features can be integrated into the lightbar bottom support 14a as needed.

The lightbar mount bracket cover 30, if implemented as a separate component from the lightbar bottom support 14a, can be a unitary plate preferably made of steel or aluminum. The surface of the plate can provide a plurality of through holes 76, 78 located in alignment with respective bores 48, 50 in the lightbar bottom support 14a. A downturned arm 72 can provide a through hole 74 to be set in alignment with the center bore 36 of the lightbar foot 12, the through hole 70 of the strap adjuster 26 and the bore 46 located at the center point of the mounting socket 42 of the lightbar bottom support 14a. In addition downturned flanges 79 can extend downwardly from the top of the cover for positioning the cover on the bottom support 14a. Relative to the surface of the plate of the lightbar mount bracket 30, the downturned arm 72 can be disposed at less than or equal to a right angle. The preferred angle between the downturned arm and the surface of the plate of the lightbar mount is about 90 degree but may be increased or decreased somewhat with a slight angle to increase the downward pull when the strap is tightened. A range of angles between 75 and 105 degrees may be implemented to increase the downward pull on the lightbar mount bracket 30 when bolt 20 is tightened. For additional support, any of the edges of the lightbar mount bracket 30 can be flanged at 79 to aid in positioning the bracket 30 on the bottom support 14a.

The lightbar foot 12 can be coupled to the strap adjuster 26, the lightbar bottom support 14a and the lightbar bracket 30 by way of a suitable fastener such as a bolt 20. The shank 60 of the bolt 20 can pass through the bore 70 of the strap adjuster 26, the bore 36 of the lightbar foot 12, the bore 46 of the lightbar mount bottom support 14a and the bore 74 of the lightbar mount bracket 30. The bolt 20 can be suitably tightened with a threaded engagement either embedded in any of the bores or with a nut. The shank 64 of the bolts 22 pass through arcuate slots 32, 34 of the lightbar foot 12 and a bore 44 of the lightbar bottom support 14a for rotational adjustment of the lightbar 110 about a tilt axis with respect to the foot 12. Thus, the bolts 20 and 22, the bracket mounting socket 42, the molded annulus 38 form the connector 15 that rotatably mounts the lightbar bracket 14 to the foot 12 for rotational adjustment of the lightbar bracket 14 with respect to the foot 12 about and axis through bolt 20. Bolt 20 typically has an axis that is parallel to a longitudinal axis of the lightbar so that the rotation of the lightbar bracket 14 with respect to the foot will rotate the lightbar with respect to the vehicle so that the output of the lightbar will be appropriately aligned with the vehicle.

The coupling of the annular hub 38 of the lightbar foot 12 and the mounting socket 42 of the lightbar bottom support 14a can provide a secure frictional engagement of the two members when the bolts 20 and 22 are tightened. The relative diameters of the molded annuli of the hub 38 and mounting socket 42 can allow one element to fit inside the other in a way analogous to that used in cup stacking. As shown in an embodiment of the present invention in FIG. 4, the annular hub 38 of the lightbar foot 12 is seated inside of the mounting socket 42 of the lightbar bottom support 14a. The relative diameters of the annuli can vary depending upon the implementation.

One particular advantage of the invention afforded by the design of the engagement of the molded annuli of the hub 38 and mounting socket 42 is the ease of rotational adjustment for the lightbar mount bracket 14 about a tilting axis parallel to a longitudinal axis of the lightbar to thus rotate the lightbar about a tilting axis perpendicular to the longitudinal axis of the vehicle on which the lightbar is mounted. In effect, a lightbar installed onto the universal lightbar foot and mounting assembly 10 can be rotated about an axis parallel to the longitudinal axis of the lightbar and thus be tipped forwardly or backwardly on the emergency vehicle. This rotational axis is defined by the longitudinal axis of the bolt 20. Once a desired angular position of the lightbar is achieved, the bolts 20 and 22 can be tightened, frictionally seating the molded annuli of the hub 38 and mounting socket 42. Tightening the bolts 22 in the arcuate slots 32, 34 can provide additional security to hold the lightbar mount bracket 14 in place.

The lightbar mount bracket 30 can be connected to the lightbar bottom support 14a by mechanical coupling through the through holes 76, 78 in alignment with the respective bores in the bosses 48, 50. A lightbar (not shown) can additionally couple into the lightbar mount bracket 30 via the same bores. Suitable fasteners (not shown) can be used to secure the lightbar mount bracket 30 and the lightbar bottom support 14a through the provided through holes 76, 78, in bosses 48, 50. As previously described, the lightbar mount bracket 30 and the lightbar bracket cover can also be connected by a bolt 20 through the bore 46 of the lightbar mount bottom support 14a and the bore 74 of the lightbar mount bracket 30.

The lightbar 110 can be connected to the universal lightbar foot and mounting assembly 10 by the lightbar bracket 14. One method of engagement can be to mechanically couple the lightbar to the lightbar bracket 14 through the bores 48, 50, 76, 78 as previously described for securely coupling the bracket cover 30 to the lightbar bottom support 14a. Other methods can include attaching clips or snaps to the lightbar bracket 30 that engage the lightbar. The method of engagement of the lightbar to the lightbar bracket 14 can vary, depending upon the particular configuration of the lightbar.

Figure 4:
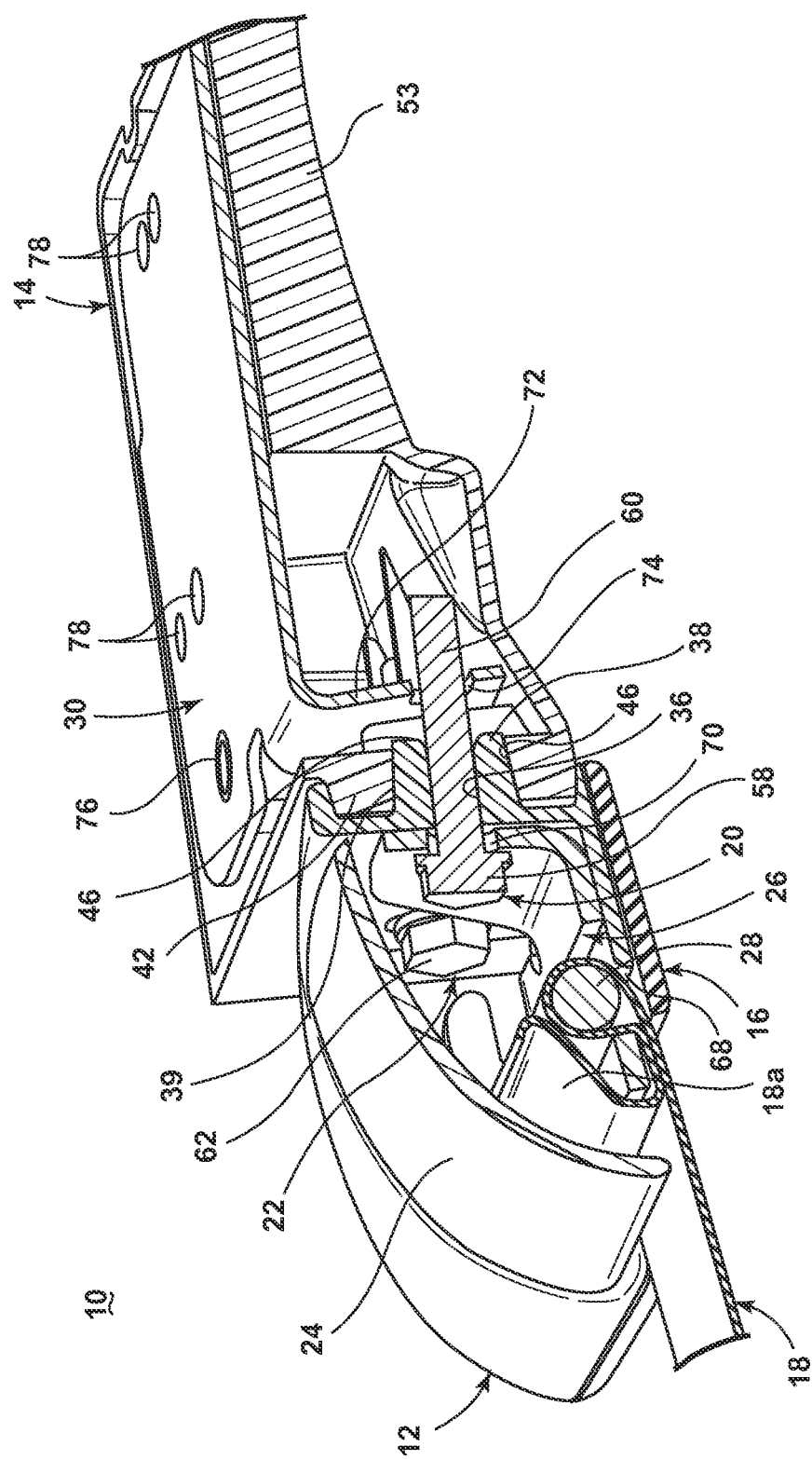
FIG. 4 is a perspective sectional view of the universal lightbar foot and mounting assembly taken along the lines IV-IV of FIG. 2.
Figure 7:
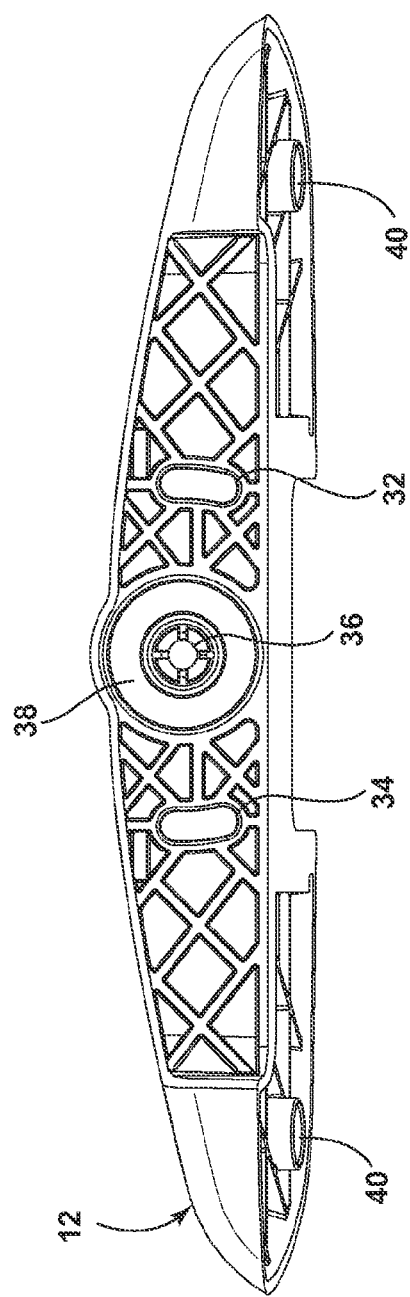
FIG. 7 is a side plan view of the side of the lightbar foot of FIG. 5 that is coupled to the mounting bracket of FIGS. 1-4.
Figure 8:
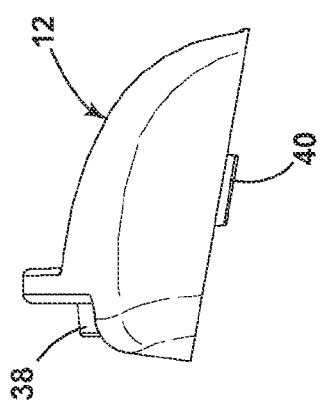
FIG. 8 is a side plan view of the profile of the lightbar foot of FIG. 5.

The universal lightbar foot and mounting assembly 10 can be connected to an emergency vehicle by fastening the free end 56 of the strap 18 to the vehicle by any suitable fastener such as a machine screw and adjusting the strap 18 weaving the strap 18 through the strap adjuster 26 and around the adjuster sleeve 28. Referring to FIG. 5, the substantially planar base surface 82 of the lightbar foot 12 can have a generally U-shaped cutout to provide space for the insertion of the strap 18. In a method analogous to that of tightening the seat belt of a race car safety harness, the strap 18 can first pass under the strap adjuster 26 into the base opening 68 and then fed over the sleeve adjuster 28 and back through the base opening 68 of the strap adjuster 26. The strap 18 can now be fed under the strap adjuster 26 and pulled tight between the strap adjuster 26 and the strap 18 itself. The knurled surface of the sleeve adjuster 28 can enhance the frictional engagement of the strap 18 in the strap adjuster 26. As illustrated in FIG. 3, the proximate end 18a of the strap 18 can be tucked inside the foot cover 24 when it is placed on the lightbar foot 12 as illustrated in FIG. 4. The free or distal end 8b of the strap 56 can be mounted to the emergency vehicle directly by way of at least one screw 98 or, alternatively, a clip. For example, a grommet can be attached to the distal end of the strap 56. A fastener such as a machine screw 98 can be threaded into the door jamb 106 of an emergency vehicle 100 to securely hook the grommet and strap 18 to the vehicle 100.

Alternative embodiments of the invention may implement alternative tensioning devices such as other clutches, ratchets and gears to securely fasten the universal lightbar foot and mounting assembly 10 to an emergency vehicle 100. In addition, the strap can be a coated wire or cable as described above and can be adjustably mounted to a wire or cable adjuster for adjustably attaching the coated wire or cable the lightbar foot for tightening the lightbar foot 12 with respect to the free end of the coated wire or cable. The cable adjuster can include a rotatable shaft that can be selectively rotatable by means of a ratchet, for example, to adjust the distance between the free end of the coated wire of cable and the light bar.

With the embodiments of the invention described here, a universal lightbar foot and mounting assembly 10 can be used to install a lightbar 110 to an emergency vehicle 100. The universal lightbar foot and mounting assembly 10 of the invention provides an assembly for easily mounting a wide configuration of lightbars to a wide configuration of emergency vehicles with highly variable longitudinal rooflines without compromising the rotational positioning of the lightbar.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A universal lightbar mounting assembly for adjustably mounting a lightbar on an emergency vehicle comprises:
   a foot including a flexible strap with a free end configured to be secured to a side of a vehicle;
   a lightbar bracket configured to be mounted to a lightbar having a longitudinal axis; and a connector including an annular hub and a mounting socket, and having a tilt axis parallel to the longitudinal axis of the lightbar and rotatably mounting the lightbar bracket to the foot for rotational adjustment of the lightbar bracket with respect to the foot;

wherein the annular hub is tapered and the mounting socket has a complementary bore, and wherein the mounting socket is configured to rotatably receive the annular hub.

2. The universal lightbar mounting assembly according to claim 1, wherein the foot further comprises a strap adjuster for adjustably attaching the flexible strap to the foot for adjusting the relative position of the foot with respect to the free end of the strap.

3. The universal lightbar mounting assembly according to claim 2 wherein the strap adjuster is a clutch that selectively retains the strap in a selected adjusted position within the foot.

4. The universal lightbar mounting assembly according to claim 3 wherein the clutch comprises a clutch bracket with an elongated opening disposed in a bottom wall thereof; a bar slidably mounted to the clutch bracket for movement transverse to the elongated opening between a release position and a locked position; wherein the strap is threaded through the elongated opening, around the bar and back through the elongated opening.

5. A method for mounting a lightbar to a vehicle comprising;
providing a lightbar have opposite ends;
attaching to each end of the lightbar the lightbar bracket of a lightbar mounting assembly according to claim 2;
attaching the free end of the flexible strap of each lightbar mounting assembly to a roof of the vehicle; and
adjusting the position of the foot of at least one of the lightbar mounting assemblies with respect to the free end of the flexible strap with the strap adjuster and thereby adjusting the transverse position of the lightbar with respect to the roof of the vehicle.

6. The method for mounting a lightbar to a vehicle according to claim 5 and further comprising the act of rotating the lightbar with respect to the foot about the tilt axis parallel to the longitudinal axis of the lightbar.

7. The universal lightbar mounting assembly according to claim 1 wherein the flexible strap is woven webbing.

8. The universal lightbar mounting assembly according to claim 7 wherein the woven webbing is non-metallic.

9. A lightbar assembly for mounting to a vehicle comprising a lightbar and a universal lightbar mounting assembly according to claim 1 mounted to each end of the lightbar.

10. A universal lightbar mounting assembly for adjustably mounting a lightbar on an emergency vehicle comprises:
a foot including a flexible strap with a free end configured to be secured to a side of a vehicle;

a lightbar bracket configured to be mounted to a lightbar; and
a connector including an annular hub and a mounting socket, and rotatably mounting the lightbar bracket to the foot about a tilting axis parallel to a longitudinal axis of the lightbar configured for rotational adjustment of the lightbar bracket with respect to the foot;
wherein the flexible strap is fixedly secured to the emergency vehicle and wherein the annular hub is tapered and the mounting socket has a complementary bore, and wherein the mounting socket is configured to rotatably receive the annular hub.

11. The universal lightbar mounting assembly of claim 10 comprising a mechanical fastener, wherein the mechanical fastener fixedly secures the flexible strap to the emergency vehicle.

12. The universal lightbar mounting assembly of claim 11 wherein the mechanical fastener is at least one of a screw or a clip.

13. The universal lightbar mounting assembly of claim 11 wherein the flexible strap further comprises a grommet selected to correspond with the mechanical fastener, wherein the mechanical fastener fixedly secures grommet to the emergency vehicle.

14. The universal lightbar mounting assembly of claim 10 wherein the flexible strap further comprises a distal end opposed to the foot, and wherein the distal end of the flexible strap is fixedly secured to the emergency vehicle.

15. A universal lightbar mounting assembly for adjustably mounting a lightbar on an emergency vehicle comprises:
a foot including a clutch and a flexible strap with a free end configured to be secured to a side of a vehicle, wherein the clutch includes:
a clutch bracket with an elongated opening disposed in a bottom wall thereof; and
a bar slidably mounted to the clutch bracket for movement transverse to the elongated opening between a release position and a locked position such that the flexible strap is selectably threaded through the elongated opening, around the bar and back through the elongated opening;
a lightbar bracket configured to be mounted to a lightbar having a longitudinal axis; and
a connector having a tilt axis parallel to the longitudinal axis of the lightbar and rotatably mounting the lightbar bracket to the foot for rotational adjustment of the lightbar bracket with respect to the foot;
wherein the clutch is configured for adjustably attaching the flexible strap to the foot for adjusting the relative position of the foot with respect to the free end of the strap and wherein the clutch selectively retains the strap in a selected adjusted position within the foot.

* * * * *